United States Patent
Nussbaumer et al.

(10) Patent No.: US 6,658,824 B2
(45) Date of Patent: *Dec. 9, 2003

(54) APPARATUS FOR TRANSFERRING FLOWABLE MATERIAL

(75) Inventors: Arthur Nussbaumer, Düdingen (CH); Markus Schneuwly, Düdingen (CH)

(73) Assignee: AT Anlagetechnik AG, Dudingen (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/411,833

(22) Filed: Oct. 4, 1999

(65) Prior Publication Data
US 2002/0162300 A1 Nov. 7, 2002

(30) Foreign Application Priority Data

Nov. 4, 1998 (EP) .............................. 98120899

(51) Int. Cl.⁷ ................................. B65B 1/30
(52) U.S. Cl. ........................ 53/505; 53/381.4
(58) Field of Search ................ 53/492, 381.4, 53/505; 414/411; 222/504, 559; 493/313

(56) References Cited

U.S. PATENT DOCUMENTS

| 3,765,146 A | * | 10/1973 | Ghiretti |
| 4,382,739 A | * | 5/1983 | Mack et al. |
| 4,975,240 A | * | 12/1990 | Lahr et al. |
| 5,050,367 A | * | 9/1991 | Heisler |
| 5,351,864 A | * | 10/1994 | Semenenko et al. |
| 5,603,599 A | * | 2/1997 | Wesslen et al. |
| 5,673,533 A | * | 10/1997 | Wang et al. |

FOREIGN PATENT DOCUMENTS

| EP | 0 847 946 A1 | 12/1996 |
| WO | WO94/19265 | 9/1994 |
| WO | WO98/43902 | 10/1998 |
| WO | WO98/46505 | 10/1998 |
| WO | WO00/34163 | 6/2000 |

* cited by examiner

Primary Examiner—Eugene Kim
(74) Attorney, Agent, or Firm—Burns, Doane, Swecker & Mathis, LLP

(57) ABSTRACT

The transfer device has a means of securing the grip of the lifting device on the lid (14), in the form of an elastic suction pad (11) with narrowing and widening aperture and a suction line (21). The closer (8) can grip the lid and exert suction on it. There is a monitoring device, possibly with a sensor, to monitor the seating of the lid on the lifting device.

33 Claims, 3 Drawing Sheets

APPARATUS FOR TRANSFERRING FLOWABLE MATERIAL

BACKGROUND OF THE INVENTION

1. Field of the Invention

The present invention is directed to an apparatus for transferring flowable material, particularly bulk material, and more particularly to an apparatus of the type usually referred to as an Intermediate Bulk Container or IBC.

Such an apparatus usually comprises a container for receiving material which includes at least one opening for discharging said material, and optionally another opening for charging the container. In addition containers are known which have a plurality of discharge openings. For the discharge opening, there is a closure member which is displaceable from an open position to a closed position. An actuator displaces the closure member from the open position to the closed position, or vice-versa, along an axis of actuation.

There is at least one docking surface for engaging a counter-surface of a take over device, formed by another container, a hopper or the like. This counter-surface defines a charging opening of the take over device which is normally closed by a cover or lid. For removing the cover, a variety of devices were suggested in the past, but one of them uses a source of vacuum, and at least one vacuum operated lid removal device, a surface of which engages the cover or lid and opens the charging opening of the take over device. For this engagement, the lid removal surface is connected to the vacuum source via a corresponding suction conduit.

2. Background Information

An apparatus of this type is disclosed in U.S. Pat. No. 5,351,864, which is hereby incorporated by reference. According to this patent a vacuum device replaces other known devices, such as a lid lifting magnet in accordance with DE-B-1 188 882 or a mechanical removing device according to EP-A-0 847 946, for example, the disclosures of which are hereby incorporated by reference. All these lid lifting or removing devices have in common that, although the cover or lid has to be removed automatically, assuming that they work reliably, there is nothing to ensure or monitor whether this is actually the case. In principle, it does not matter whether it is the question of a liquid material or of bulk material which forms a flowable material, although the latter will be the rule. The take over part, which may be closed by the cover, will normally be an IBC, as mentioned above, although it may simply be constituted by a filling opening of a charging hose, as disclosed in EP-A-0 384 826, which is hereby incorporated by reference.

For example three typical conditions can be envisaged where a vacuum device and its suction cup according to U.S. Pat. No. 5,351,864 will and must fail:

- the suction cup is worn out and/or has a hole so that an underpressure necessary for lifting the cover cannot build up. This will occur regularly after a certain period of operation which depends on the abrasivity of the flowable material, the operational conditions and the working time.
- the cover is soiled by bulk material or other flowable material so that the suction cup does not find a hold and, thus, does not lift the cover.
- the cover is somewhat inclined and not in a position perpendicular to the axis of actuation.

All these inadequacies are partly due to the construction of the vacuum operated lifting device used heretofore. It is quite clear that it is the question of relative massive structures, which led one to assume that the suction cup had consequently also to be sturdy in order not to cause tilting the cover during reclosing due to too great a flexibility. Therefore, the suction cup was substantially formed as a bubble cap which had an enlargement surrounding a suction opening and passed over into a narrowing section, so that the cover should have no opportunity to tilt after sucking it on. However, the inventor's discovered restricted flexibility and the possibility to move caused the above enumerated inadequacies.

SUMMARY OF THE INVENTION

Therefore, it is an object of the present invention to efficiently avoid the above-mentioned failures in operation.

According to the present invention, this object is achieved in an apparatus of the type described by providing means for ensuring an engagement of the lid removal device or surface with the cover. Exemplary embodiments include either forming the lid removal surface immediately on the closure member of the container and/or by providing a monitoring arrangement for monitoring the engagement of the lid removal surface and the cover, the monitoring arrangement emitting an engagement signal either when the lid removal surface engages the cover properly and/or optionally emitting another signal when this is not the case, the latter being preferred. This signal may be evaluated either by simple indication or alarm or by initiating a lid removal program anew for another trial.

The lid removal surface on the closure member can preferably be formed on a suction cup which, when seen in a direction from said suction opening to said vacuum connection opening, has at least one succession of a first narrowing section to form a pleat and a second, enlarging section. In this way, the former disadvantage of the cup being too stiff is avoided due to the pleat. The greater flexibility enables automatic compensation of any disengagement of the suction cup on the cover. On the other hand, for reasons of required space and limitation of flexibility, it is advantageous if the suction cup comprises three pleats in maximum or even only two narrowing sections in maximum.

It can be useful to form the closure member with a first, inner conical surface, which is known per se, but in the present context provides an increasing effect of the vacuum applied through the closure member itself when the cover is sucked in. In addition, the cover can comprise a second, outer conical surface for insertion into the first conical surface, and this outer conical surface is preferably complementary to the inner conical surface of the closure member. In such a case, the two conical surfaces may provide a sealing surface and a counter-sealing surface.

It is surprising that by the simple measure of forming the lid removal surface directly on the closure member itself a variety of advantages are achieved. For example,

- by omitting the usual mechanism for displacing the lid removal surface in relation to the closure member, the design is simplified. It is only necessary that the cover is moved close enough to the closure member that the latter is enabled to suck the cover onto the lid removal surface;
- in doing so, possible failures are reduced, and the former mechanism, since omitted, need not be maintained or repaired;
- the whole structure is simplified so that its costs of manufacturing are reduced;

since the whole closure member is used for sucking the cover on, a much larger cross-section of the suction opening, which faces the cover, will result so that the position of the cover is better defined than with a limited, smaller cross-section, as disclosed in U.S. Pat. No. 5,351,864 where only a small difference of the cover's position from the nominal one precisely perpendicular to the axis of actuation will result in a large angular deviation of the cover's edges due to leverage; in addition, the lid removal surface directly on the closure member will, in general, be larger than in the prior art, thus ensuring safe holding of the cover.

In addition or as an alternative, the above-mentioned monitoring arrangement may be provided for monitoring the engagement of the lid removal surface and the cover. Monitoring may be effected by a sensor, such as a sensor which determines directly the position of the cover relative to the closure member (for example an ultrasonic reflected wave sensor for determining the distance of the cover from an inner surface of the closure member) or an indirect acting sensor which determines the underpressure and or the flow rate building up between the cover and the closure member or in a suction line connected to the latter. As mentioned above, this monitoring arrangement will provide a signal to be evaluated which indicates whether the cover is engaged properly or not by the lid removal surface. A directly measuring position sensor would determine whether the cover, when being lifted by the lid removal surface, changes its relative position to the closure member, thus indicating that it is not held properly. However, the indirect method is much simpler and, therefore, preferred. Moreover, it is preferred to determine the pressure rather than the flow rate, because with pressure one of the above failures can reliably determined in a simple way. For example, at least one sensor arrangement can be coupled to a suction conduit, the sensor arrangement providing a positive ("lid is engaged") and/or a negative ("engagement has failed") signal to the evaluation device.

As to the evaluation, various approaches can be used. For example, the signal of the monitoring arrangement can initiate a program which tries again to remove the cover (which may also be shifted horizontally after engagement instead of or in addition to being lifted), optionally after blowing dust or some bulk material away which can possibly be present on the cover and may prevent proper sucking and lifting it. This may either be done manually by switching an initiating switch on or by a docking or position sensor, as mentioned above, which releases such an initiating switch member (optionally formed by a switch valve).

BRIEF DESCRIPTION OF THE DRAWINGS

Further details of the invention will become apparent from the following description of embodiments schematically illustrated in the drawing, in which.

DETAILED DESCRIPTION OF THE DRAWINGS

Figure 1:
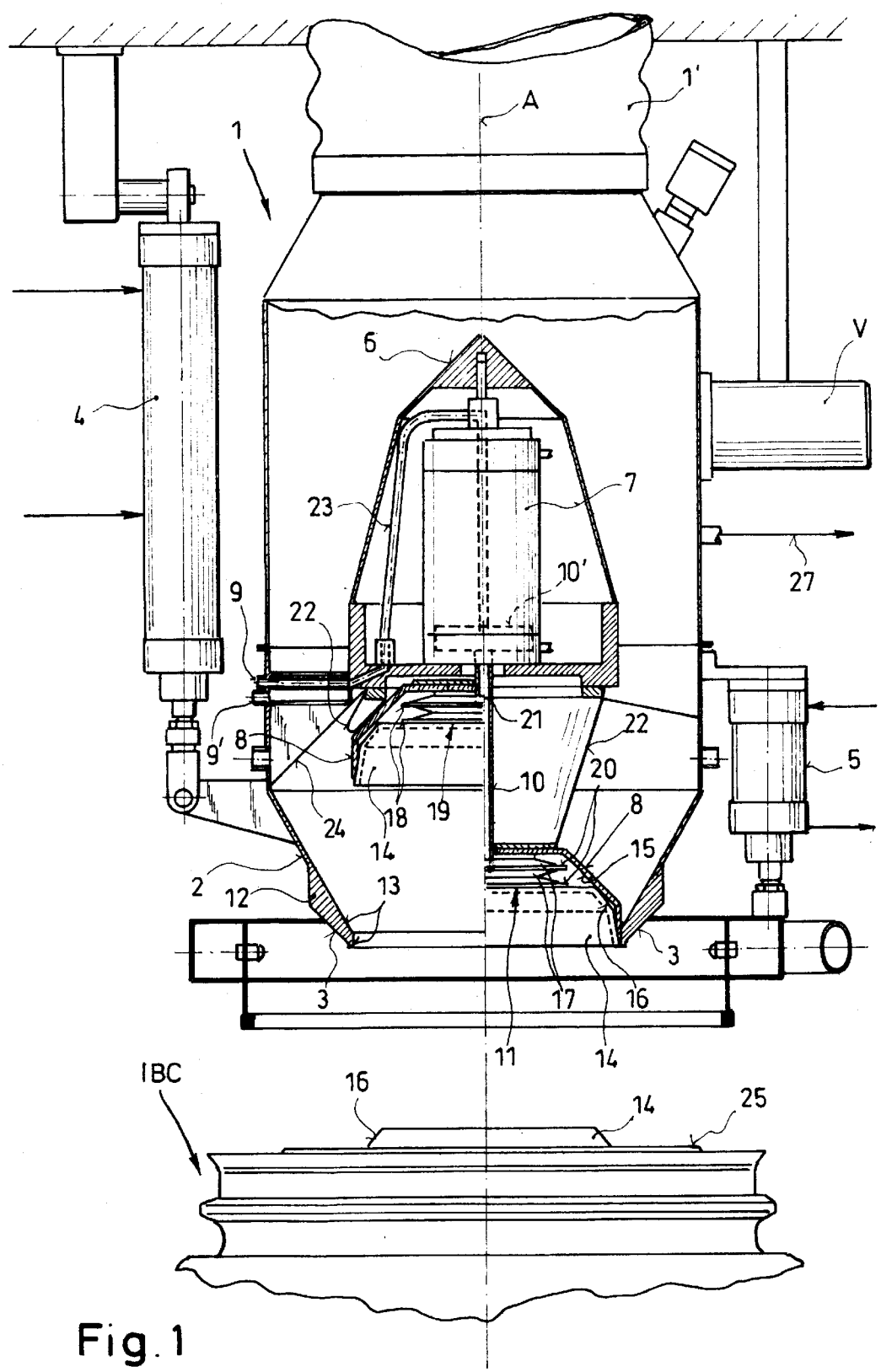
FIG. 1 shows a longitudinal cross-section of a container comprising a lid lifting device according to an exemplary embodiment of the invention which engages safely a cover of a take-over container or the like docked.

According to FIG. 1, a container 1 for receiving flowable material, such as bulk material, is provided. Flowable material is supplied by way of a conduit 1'. At its bottom end, the container 1 has a discharge cone 2 and an annular docking surface 3 for tight engagement of a take over device in the form of an Intermediate Bulk Container IBC, its top portion being indicated below the container 1, or of a hose taking over the flowable material from the container 1. When discharging the container 1, it is optionally vibrated by means of a vibrator V. The respective take-over device can be drawn to the docking surface 3 by means of cylinder units 4 and 5. The docking surface 3 is preferably situated within the range of the discharge opening 2, but can also be higher up if it is intended to lift the respective take-over device to a higher level.

Within the interior of the container 1, a cone 6 is provided which is held by struts 24 distributed over its circumference (only one strut 24 is visible in FIG. 1). Below the cone 6, there is an actuating member, such as a cylinder unit 7, a lifting bellow or, as preferred, a cylinder comprising a roller membrane (see U.S. patent application Ser. No. 09/341,406 of Feb. 2, 1999, the disclosure of which is hereby incorporated by reference), for actuating a pot-shaped closure member 8 along a vertical axis of actuation A. In this way, the cone 6 protects the actuating member 7 as well as its fluidic (preferably pneumatic) supply and/or evacuating conduits 9 and 9'. The whole region above the closure member 8 is sealed against flowable material, when being discharged, by a covering apron 22, e.g. of plastic material, the lower edge of which is being fastened to the closure member 8 so that it folds together in the manner shown in FIG. 1 at left when the closure member 8 is moved in an upward direction.

By this cylinder unit 7, a piston rod 10 may be moved up and down which has two functions: On the one hand, the closure member 8 itself can be moved up and down, and on the other hand a suction cup 11 according to the invention which has a double pleat, as shown (20 in FIG. 2), is also moved by this piston rod 10. In FIG. 1, the side to the left of the axis of actuation A (which is in this embodiment, although not necessarily, also the longitudinal axis of the container 1) shows the closure member 8 in an open position, whereas at the right side it is in closed position in which it cooperates with an inner surface 13 of a sealing rim 12. The outer surface of this sealing rim 12 forms the docking surface 3.

In closed position, the suction cup 11 faces a cover or lid 14 which closes the respective take-over device. It would be possible to construct the cylinder unit 7 with a double cylinder in which an outer one of two concentric cylinders is used to actuate the closure member 8, while an inner cylinder effects a relative movement of the suction cup 11 with respect to the closure member 8. In this manner, the suction cup 11 could be moved still further down to a cover 14 of the take-over device which is held in a downward distance below when the closure member 8 is in closed position, as shown at right in FIG. 1. Such double cylinders are known per se, the outer cylinder having an annular piston and a hollow piston rod in which an inner piston rod of the inner cylinder is guided. Considering this, the advantage of the double function of the simple cylinder unit 7 as an actuator of both the closure member 8 and as a lid removal device for lifting the cover 14 is clear. Thus, when using different names for these devices in the course of this specification, it should be kept in mind that they may be formed by a single common unit, where the lifting device comprises also a suction conduit to be described below.

The design is substantially simplified, if the suction cup 11 in its closed position of the closure member 8 engages the upper (or any) surface of the cover 14, because in such a case only a simple cylinder unit 7 is necessary to serve the above-mentioned purpose. The double plied suction cup shown helps in compensating any tolerance. In order to facilitate assuming this relative position, it is advantageous if the cover 14 has an outer conical surface 16 which protrudes into an inner conical surface 15 of the closure member 8 suitably in a complementary fashion, as shown. It is to be understood that the two conical surfaces 15, 16 have not to be necessarily complementary, i.e. forming an identical angle to the axis of actuation A. Small deviations of the angle do not cause any harm, although it is preferred if the angular position is complementary, because in this case the surfaces do not only engage each other along a line, but form a sealing surface and a counter-sealing surface each along which the inner surface of the closure member 8 and the outer surface of the cover 14 tightly engage each other. This can be used in the manner described below where the suction cup 11 is completely omitted, thus further simplifying the design and making it still more reliable.

As is seen in FIG. 1, the suction cup 11 has a bellow-like configuration comprising two narrowing sections 17 alternating with enlargements 18, thus forming pleats. This design makes the suction cup 11 particularly flexible so that the edge delimiting its lower suction opening 19 can easier adapt itself to any unevenness of the cover 14 either of its own edge due to wear or to unevenness caused by bulk material lying on the outer surface of the cover 14. Thus, the engagement of the suction cup 11 on the cover 14 and lifting of the cover 14 from its closed position, shown at right, to its lifted open position, shown at left, may be ensured in spite of the above-mentioned unfortunate conditions.

In FIG. 1, two pleats 20 of the suction cup 11 are shown which are formed by two narrowing sections 17 alternating with enlargements 18. Although any desired number of pleats can be used, if more than three pleats 20 are provided, the suction cup 11 may become too soft. In such case, the suction cup would be dangling like a trunk so that, due to its undefined position it might be easily affected by vibrations and its engagement on the cover 14 may not ensured as is desirable, unless its behavior is improved by appropriately choosing stiffer material. Since, however, stiff material is less adapted to the requirements of this application, it is preferred that the elastic suction cup 11 has no more than three restricted pleats 20, preferably no more than two narrowing sections 17. In this way, one meets contradictory requirements of a flexible, compensatory engagement of that edge of the suction cup 11 which delimits its suction opening 19, on the one hand, and a well-defined position (which should be horizontal and at right angles to the axis of actuation A) of this edge, as much as possible unaffected by vibrations in harsh everyday operational conditions. Underpressure is supplied to the suction cup 11 through a suction conduit 21 by a vacuum unit (not shown, but known per se), such as a suction fan, an injector or a pump. The suction conduit 21 is conveniently formed, at least in part, as a bore within the actuating piston rod 10 of a piston 10' to which underpressure can be fed through a radial bore provided in it and an appropriate connection nipple as well as a hose 23 communicating with the conduit 9.

Figure 2:
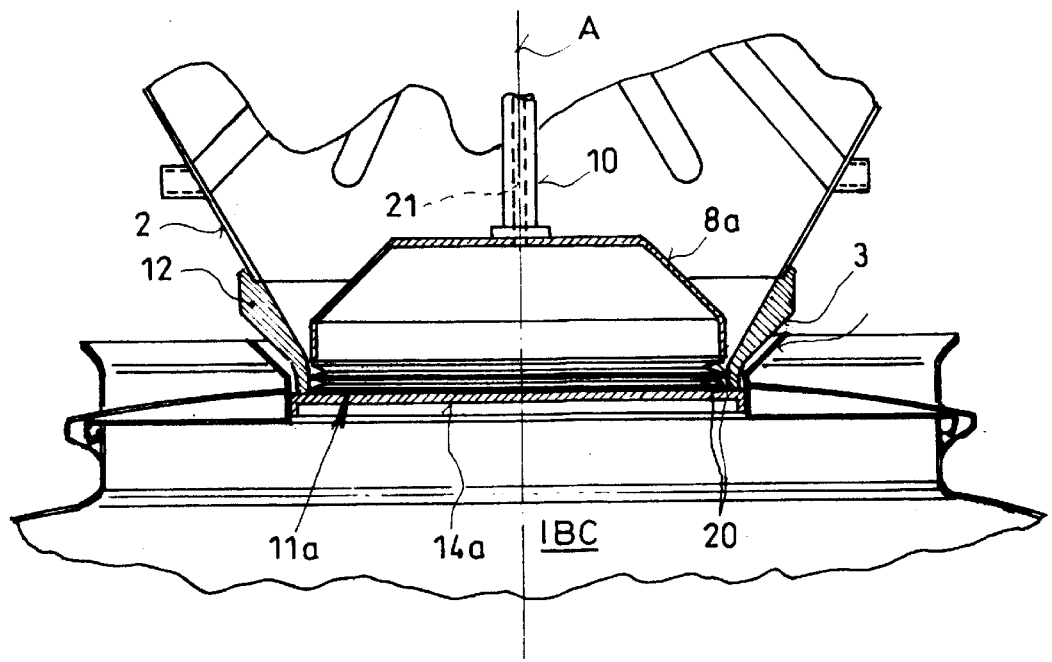
FIG. 2 illustrates a first exemplary modification of the lifting device.

An improvement of this arrangement is shown in FIG. 2, illustrating in detail a modified embodiment of the closure member 8a constructed as a lifting unit for a flat cover 14a, the remaining parts of the container being omitted. Parts of the same function have the same reference numerals as in FIG. 1, while parts of merely a similar function have the same reference numerals, but with a letter added.

Accordingly, the closure member 8a is formed itself as a part of a suction cup which communicates with the suction conduit 21 and has an elastic suction cup 11a at its lower end. As in the embodiment of FIG. 1, the suction cup 11a has preferably at least one pleat 20. This elastic suction cup 11a is adapted to engage even a flat cover 14a. If the cross-section acting upon the cover 14a is larger than in the embodiment of FIG. 1, undesirable tilting or inclining of the cover 14a is less probable, but it is safely held in a position at right angles to the axis of actuation A. With this, safe replacing of the cover 14a after filling the IBC is also ensured. It will be understood that a suction cup 11 according to FIG. 1 or to the prior art can be used in addition to the suction cup 11a so that the cover 14 or 14a is held inside and outside the closure member 8 or 8a. In general, this will not be necessary, because alone the arrangement shown will ensure safe engagement of the lifting device 11a, 21 on the cover 14a.

Figure 3:
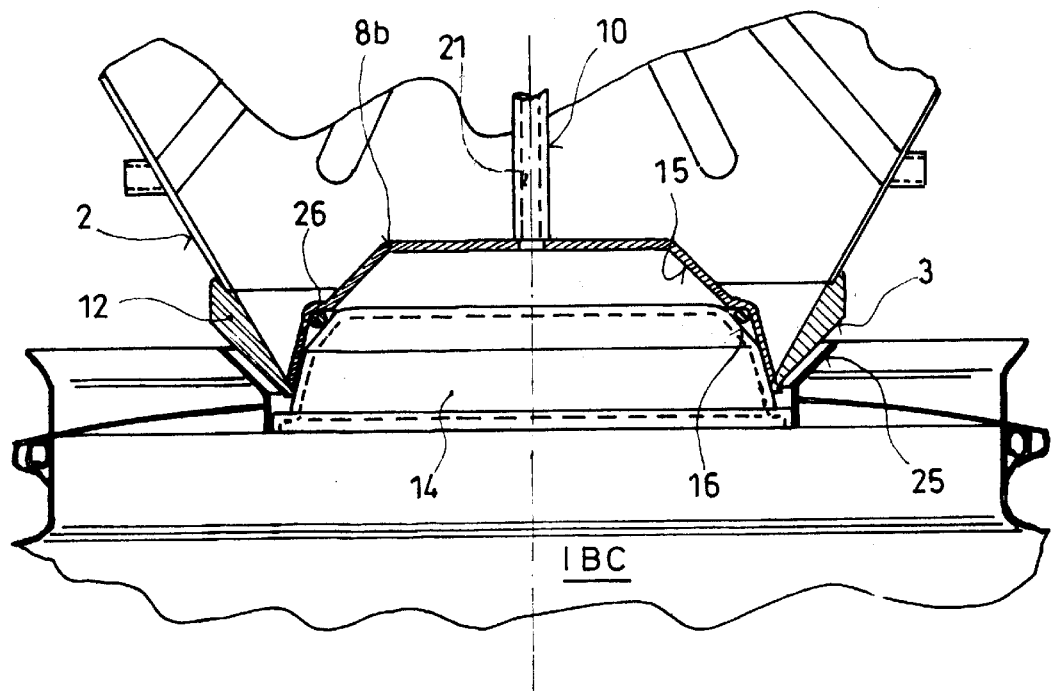
FIG. 3 shows another exemplary embodiment of the lifting device.

Lifting and replacing the cover 14 is made still simpler and more reliable if a design according to FIG. 3 is used. In this construction, any suction cup is omitted, but a configuration is used in which the closure member 8b and the cover 14 sealingly engage each other immediately upon docking the IBC when its collar edge 25 contacts the docking surface 3 of the sealing element 12. This means, in turn, that at least the conical surfaces 15 and 16 act as a sealing surface and counter-sealing surface. Preferably, at least one of these sealing surfaces comprises a sealing member, particularly an elastic one, which is conveniently formed by a circumferential ring 26.

Due to the conical surfaces 15, 16, a strong and tight suction pressure of the two parts 8b and 14 into each other will result. If, in addition, an elastic sealing member 26 is provided, the two parts 8b, 14 will tightly adhere to each other under the suction effect exerted through the suction line 21 without needing a special mechanism as in the prior art. This means that such a design is not only simpler to manufacture and less expensive, but enables safer lifting, holding and replacing the cover 14 than was possible according to the prior art. The majority of the inadequacies and disadvantages mentioned at the outset of this specification will, thus, be avoided.

Figure 4:
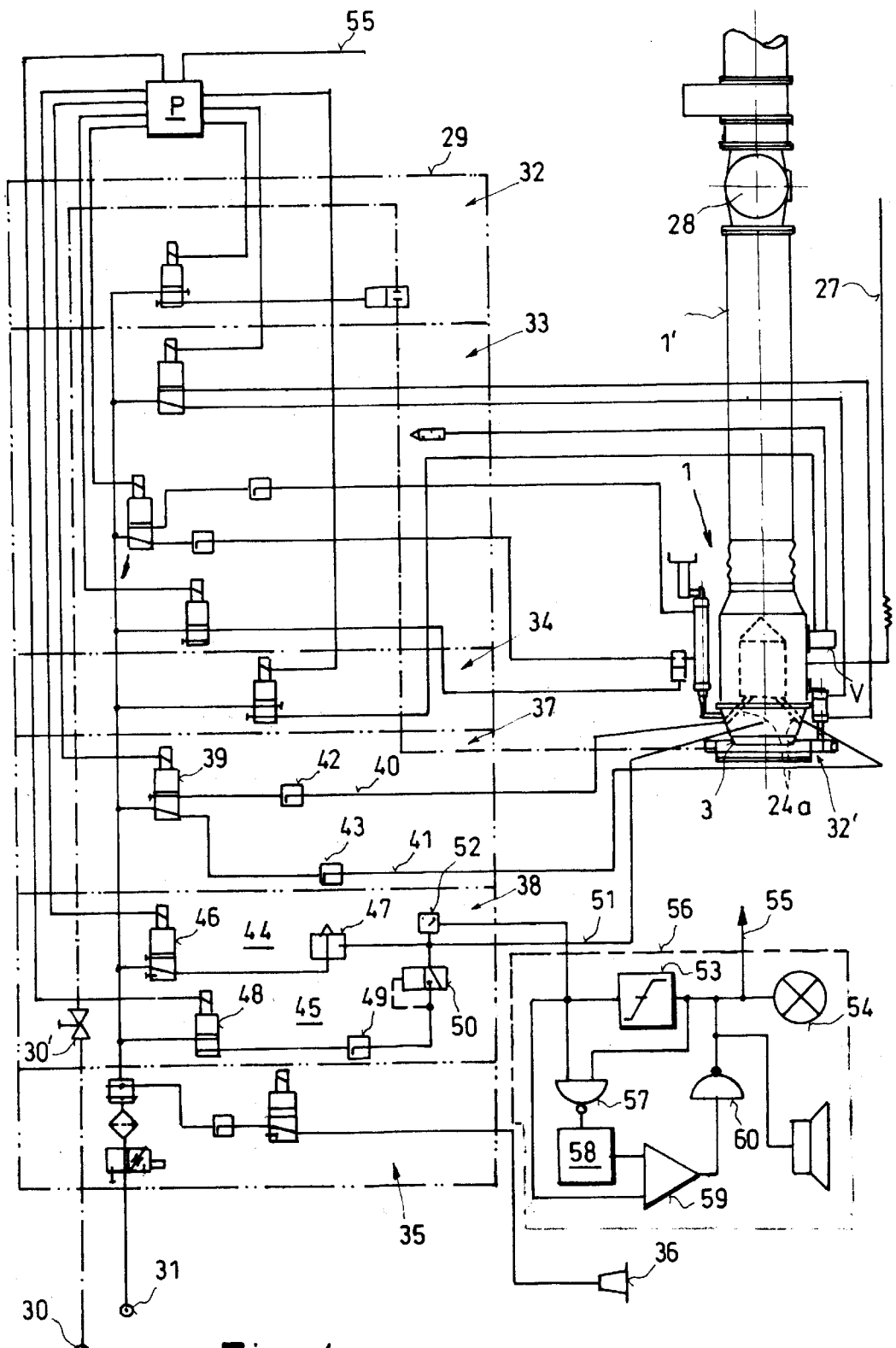
FIG. 4 shows a circuit diagram of an exemplary monitoring arrangement according to the present invention in an apparatus that can either be equipped with a suction cup of the prior art or, as preferred, with one of the lifting devices of FIGS. 1, 2 or 3.

Additionally or alternatively, engagement of the lifting device on the cover may be ensured in the manner described below with reference to FIG. 4 where again a container 1 is shown communicating with a pendulum-type conduit 27, as known per se, for exhausting air which escapes when flowable material is transferred. Supply of flowable material is effected through the above-mentioned conduit 1', a rotary valve 28 being at its upper end, so that the container 1 may optionally be held, for example, under an atmosphere of inert gas with a negligible gas leakage in the direction towards the rotary valve 28 above.

A control box 29 is assigned to the container 1 and communicates with two supply conduits 30, 31, the connection 30 serving for supplying inert gas, such as nitrogen, with a predetermined nominal flow rate per time unit, for example between 100 and 150 standard m$^3$/hour, and a predetermined nominal pressure of 2.5 to 4.5 bar, for example. The connection is only open when necessary and is normally closed by a valve 30'. The connection 31 can be provided for supplying pressurized air of about the same pressure as the inert gas, but optionally with a lower flow rate, such as 30 to 50 standard m³/hour.

In the interior of the control box 29, preferably being explosion-proof, there is a first assembly 32 of pneumatic control elements for cleaning (dedusting) through a unit 32', a second assembly 33 for actuating the cylinders 4, 5, and a third assembly 34 for controlling the vibrator V. Furthermore, there is yet another assembly 35 to be mentioned which is for actuating a knocker 36 acting onto the IBC (not shown here) for chipping off any adhering flowable material. These assemblies are well known to those skilled in the art and need not to be described in detail. As shown, the valves to be switched over in the control box 29 are, in general, electromagnetic valves, controlled either by manually actuable switches (not shown) or, as is preferred, by switching stages actuated by a program unit P (FIG. 4), such as a microprocessor. The program unit P controls the steps described in the following, e.g. by a program contained in a memory. The program unit P, in the case of FIG. 4, contains, of course, all the necessary control stages and switches for the electromagnetic valves connected to it.

Furthermore, the assemblies 37, 38 shown are in close functional connection and, therefore, are the most suitable starting point for explaining the program control P which, in a simplified embodiment, could be realized by timing relays and other switching elements, such as position sensors. Among them, the assembly 37 is for controlling the suction cylinder 7 and for lifting or lowering the suction cup 11 or 11a and the closure member 8, 8a or 8b. The assembly 38 is for sucking the cover 14 or 14a on or for blowing pressurized air.

After docking the IBC by means of the cylinders 4 and 5 controlled by the assembly 33, the assembly 37 will begin its work. This can be effected either by manual release, as mentioned above, or by program control. This assembly 37 has an electromagnetic switching or ON-OFF valve 39 including an input connected to the conduit 31, and two outputs 40, 41. In each of these output lines 40 and 41, a valve 42, 43 is provided for determining the output pressure. The output lines 40, 41 lead from the valves 42, 43 to the conduit 9' (FIG. 1) as well as to a further connection (not shown in FIG. 1) which pressurizes the opposite side of the cylinder 7. Parts of the conduits are suitably formed by struts 24a (compare 24 in FIG. 1).

The assembly 38 is somewhat more complicated in construction and has a first path 44 for sucking air through the suction cup 11 or 11a or the closure member 8a or 8b formed as a suction cup. A path 45, however, serves for blowing air through these parts and the assigned supply conduits, as will be described below. The suction path 44 comprises substantially an electromagnetic switching or ON-OFF valve 46 and a postponed Venturi tube. The pressure path 45 comprises also an electromagnetic switching valve 48 as an initiating member for this path, and a postponed pressure regulating valve 49 adjusted to a predetermined pressure value of 1.2 to 1.9 bar, for example. Afterwards, there is a pressure dependent switched valve 50 which opens only when the nominal pressure defined by the switching valve 48 and the pressure regulating valve 49 exists at its input. It is to be understood that the electric circuit for controlling the two electromagnetic valves 46, 48 is such, that simultaneous opening of both valves 46, 48 is excluded. Therefore, it is possible to assign a common output conduit 51 to both paths 44 and 45 rather than providing separated output conduits.

According to a preferred embodiment, the mode of operation (and, optionally, an assigned program) is as follows.

First, it is ensured by blowing onto the docking area (surface 3) by means of the components 32, 32', that a sealing engagement is not prevented by dust when docking. Then, the intermediate container IBC, by corresponding actuation of the cylinders 4, 5 via the control assembly 33, is docked in such a manner that its sealing collar 25 engages tightly the sealing surface 3. In this condition, the closure member 8 is in closed position, shown at right in FIG. 1, in which it engages the inner surface 13 of the sealing element 12. Since, in this embodiment, the closure member 8 and the suction cup 11 are actuated in common by the cylinder 7, the suction cup 11 must sealingly engage the cover 14 at this moment. Otherwise a (separated) cylinder for the suction cup 11 had to be provided and actuated for lowering it further.

Then testing the conduits can be effected according to a preferred embodiment in such a manner that air is either blown or sucked through the conduit 51 and the communicating conduit system 9, 21 (valve 46 or 48 is open). The drop in pressure building up or the absolute pressure (or the flow rate) is monitored by a sensor element 52 which may also comprise a valve. In this connection, two advantageous modes of operation can be used. Either air is blown through to clean the surface of the cover 14 and, thus, to ensure safe suction engagement of the same for lifting it. If the pressure built up exceeds a predetermined threshold value (which can be detected by means of a threshold switch 53 coupled to the sensor element 52), this means that the conduit system 51, 9, 21 is clogged or contaminated, and an alarm signal is released through an acoustic and/or optical warning device 54 which, preferably, switches off the program via an output line 55. It may be seen that parts 53–55 constitute also an evaluation circuit 56, the evaluation circuit being alternatively able to switch over, after having blown through the path 45, to sucking through the path 44 in order to try to clear the conduit system. In the first case, the evaluating circuit 56 operates as a mere indication device, in the second case the evaluation circuit 56 is a control unit.

Another possibility resides in that, at the beginning, air is sucked in through the conduit system 21, 9, 51, and the underpressure (or the flow rate) building up is determined by the sensor element 52. Since sucking serves the engagement with the cover 14 and too high an underpressure can indicate clogging of the conduit system, one has to proceed, in such a case, in a manner analogous to the one discussed above. If, however, a threshold value of underpressure is not exceeded, the value measured in this sucking trial can be used as a NORMAL value of the underpressure in the conduit system and can be memorized as a nominal value. This can be done by providing a NAND-gate 57 at the output of the threshold value switch 53 which gate has its other input signal derived from the sensor 52. Only in a case when the signal value provided by the sensor 52 does not exceed the threshold value of the switch 53, the NAND-gate 57 is opened, and the corresponding signal value supplied by the sensor 52 is fed to a memory 58 to store this value as a nominal value. The sensor 52 can either supply a signal which is already a binary one, or an A/D converter is postponed after the NAND-gate 57 or is integrated in the memory 58. Alternatively, the sensor 52 can be formed itself as a threshold value member which responds only if a predetermined pressure (or a predetermined flow rate) is attained.

Now, the valve 46 is switched in any case in such a manner that suction air is supplied into the conduit 51 through the Venturi tube 47 so that the cover 14 (or 14a) is sucked on by the suction cup 11 (or 11a or 8b). This underpressure is monitored by the sensor element 52 in the path 44 (or by a corresponding element which determines the flow rate). If an underpressure is established which is too small in comparison with the value stored in the memory 58 or with a predetermined NOMINAL value (which may be set, for example, by a threshold value switch coupled to the sensor 52 and either being formed by the threshold value switch 53 itself or by a threshold value switch parallel to it), this means that the cover 14 has not been sucked on correctly, and again an alarm signal is fed to the warning device 54. If desired, the program can be induced via the line 55 to repeat the trial by lifting and lowering the suction cup 11 anew in case the suction cup is moveable separately from the closure member, as in the prior art. Another possibility of an evaluation includes using a comparator stage 59 which compares the value stored in the memory 58 with the actual value measured by the sensor 52, and, in case of insufficient difference, releases an alarm either via a threshold value switch or through an inverter 60. This has the advantage that the NOMINAL value stored in the memory 58 can take differences of the conduit resistance into account whereas by using a mere thresh old value switch, of the type of the switch 53, as a comparator stage, only a preset threshold value would, in general, lead to release an alarm if it is exceeded.

As soon as the cover is sucked on correctly, the unit including the closure member 8 and the suction cup 11 together with the cover 14 moves into the open position shown in FIG. 1 at left, and the IBC is filled. Filling (or emptying) can be monitored either by measuring the level of flowable material in the IBC or by monitoring the level which lowers in the container 1 or by weighing the IBC. When a desired amount of flowable material has been transferred into the IBC (or any other take-up device), the cover 14 and the closure member 8 can be moved again into the closed position, shown in FIG. 1 at right, by means of the assembly 37 and through the conduit 41. Being in this position, the path 44 of the assembly 38 is switched off by closing the valve 46. Suitably, the path 45 is switched in by opening the valve 48. Certainly, it could be sufficient to switch the path 44 off to release the cover 14 from the suction cup 11, but a forced release by pressurized air is preferred.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An apparatus for transferring flowable material, comprising:
   at least one opening for discharging said material;
   closure means for discharging material from said opening, said closure means being displaceable from an open position to a closed position;
   actuator means for displacing said closure means from said open position into said closed position along an axis of actuation;
   at least one docking surface for engaging a countersurface of a take over device which defines a charging opening of said take over device, said take over device being normally closed by a cover means;
   a source of vacuum; and
   at least one vacuum operated lid removal surface for engaging said cover means and freeing said charging opening of said take over device, said lid removal surface being connected to said vacuum source and being immediately formed as said closure means to provide engagement of said lid removal surface and said cover means.

2. Apparatus as claimed in claim 1, comprising:
   suction cup means having a suction opening for facing said cover means, an opposite vacuum connection opening being provided on said closure means and forming said lid removal surface around said suction opening.

3. Apparatus as claimed in claim 2, wherein said suction cup means, when seen in a direction from said suction opening to said vacuum connection opening, have at least one succession of a first narrowing section to form a pleat and a second, enlarging section.

4. Apparatus as claimed in claim 3, wherein said suction cup means comprises three pleats in maximum.

5. Apparatus as claimed in claim 4, wherein said suction cup means comprises two narrowing sections in maximum.

6. Apparatus as claimed in claim 1, wherein said lid removal surface comprises elastic sealing means.

7. Apparatus as claimed in claim 6, wherein said sealing means are annular.

8. Apparatus as claimed in claim 1, wherein said closure means comprise an internal engagement surface, and sealing means arranged on said internal engagement surface at least when said cover means engage said internal engagement surface.

9. Apparatus as claimed in claim 1, wherein said closure means comprise a first, inner conical surface.

10. Apparatus as claimed in claim 9, in combination with said take over device wherein said cover means comprise a second, outer conical surface for insertion into said first conical surface.

11. Apparatus as claimed in claim 10, wherein said first and second conical surfaces are complementary.

12. Apparatus as claimed in claim 1, wherein said closure means comprise an annular internal engagement surface to sealingly engage a lid.

13. An apparatus for transferring flowable material, comprising:
    at least one opening for discharging said material;
    closure means for said opening having a first, inner conical surface displaceable from an open position to a closed position;
    actuator means for displacing said closure means from said open position into said closed position along an axis of actuation;
    at least one docking surface for engaging a countersurface of a take over device which defines a charging opening of said take over device, said take over device being normally closed by a cover means which comprise a second, outer conical surface;
    a source of vacuum; and
    at least one vacuum operated lid removal surface for engaging said cover means and freeing said charging opening of said take over device, said lid removal surface being connected to said vacuum source and being immediately formed on an inner surface of said closure means to provide engagement of said lid removal surface and said cover means.

14. Apparatus as claimed in claim 13, wherein said lid removal surface is formed on said first, inner conical surface.

15. Apparatus as claimed in claim 13, comprising:

sealing means on at least one of said first and second conical surfaces.

16. An apparatus for transferring bulk material, comprising:

at least one opening for discharging said material, closure means for said opening displaceable from an open position to a closed position;

actuator means for displacing said closure means from said open position into said closed position along an axis of actuation;

at least one docking surface for engaging a counter-surface of a take over device which defines a charging opening of said take over device, said take over device being normally closed by a cover means;

a source of vacuum;

at least one vacuum operated lid removal surface for engaging said cover means and freeing said charging opening of said take over device;

suction conduit means of a certain gas conductivity interconnected between said lid removal surface and said vacuum source to connect said lid removal surface to said vacuum source;

monitoring means for monitoring engagement of said lid removal surface and said cover means, said monitoring means emitting an engagement signal; and evaluating means receiving said engagement signal for ensuring engagement of said lid removal surface and said cover means.

17. Apparatus as claimed in claim 16, wherein said monitoring means comprise:

sensor means.

18. Apparatus as claimed in claim 17, wherein said sensor means comprise:

pressure sensitive means.

19. Apparatus as claimed in claim 17, wherein said sensor means comprise:

a flow rate sensor.

20. Apparatus as claimed in claim 17, wherein said sensor means comprise:

threshold sensor means.

21. Apparatus as claimed in claim 17, wherein said sensor means are coupled to said conduit means.

22. Apparatus as claimed in claim 16, wherein said monitoring means emit said engagement signal upon mis-engagement of said lid removal surface and said cover means.

23. Apparatus as claimed in claim 16, wherein said evaluating means comprise:

at least one comparator stage for comparing a measured actual value and a desired nominal value.

24. Apparatus as claimed in claim 23, wherein said actual value comprises:

a pressure value.

25. Apparatus as claimed in claim 23, wherein said actual value comprises:

a flow rate value.

26. Apparatus as claimed in claim 23, wherein said comparator stage provides for a predetermined tolerance when comparing said measured actual value and said nominal value.

27. Apparatus as claimed in claim 16, comprising:

program control means for providing gas conductivity testing to determine an actual conductivity value.

28. Apparatus as claimed in claim 27, wherein said gas conductivity testing comprises:

passing gas through said conduit means and measuring the gas pressure as the conductivity value.

29. Apparatus as claimed in claim 27, wherein said gas conductivity testing comprises:

passing gas through said conduit means and measuring the gas flow rate as the conductivity value.

30. Apparatus as claimed in claim 27, comprising:

memory means storing said conductivity value.

31. Apparatus as claimed in claim 27, wherein said evaluating means comprise:

at least one comparator stage for comparing a measured actual value and a desired nominal value, said nominal value being derived from said conductivity value.

32. Apparatus as claimed in claim 28, wherein said gas conductivity testing comprises:

blowing gas through said conduit means in a direction towards said cover means.

33. Apparatus as claimed in claim 32, comprising:

initiating means for allowing gas to be blown through said conduit means, said initiating means being controlled by said program control means.

* * * * *

UNITED STATES PATENT AND TRADEMARK OFFICE
CERTIFICATE OF CORRECTION

PATENT NO. : 6,658,824 B2
DATED : December 9, 2003
INVENTOR(S) : Arthur Nussbaumer et al.

It is certified that error appears in the above-identified patent and that said Letters Patent is hereby corrected as shown below:

Column 4,
Lines 23-24, delete "Ser. No. 09/341,406 of February 2, 1999," and insert therefor -- 09/241,406 of February 2, 1999, now U.S. Patent No. 6,123,233, --.

Signed and Sealed this

Sixth Day of April, 2004

JON W. DUDAS
*Acting Director of the United States Patent and Trademark Office*